United States Patent Office 3,509,315
Patented Apr. 28, 1970

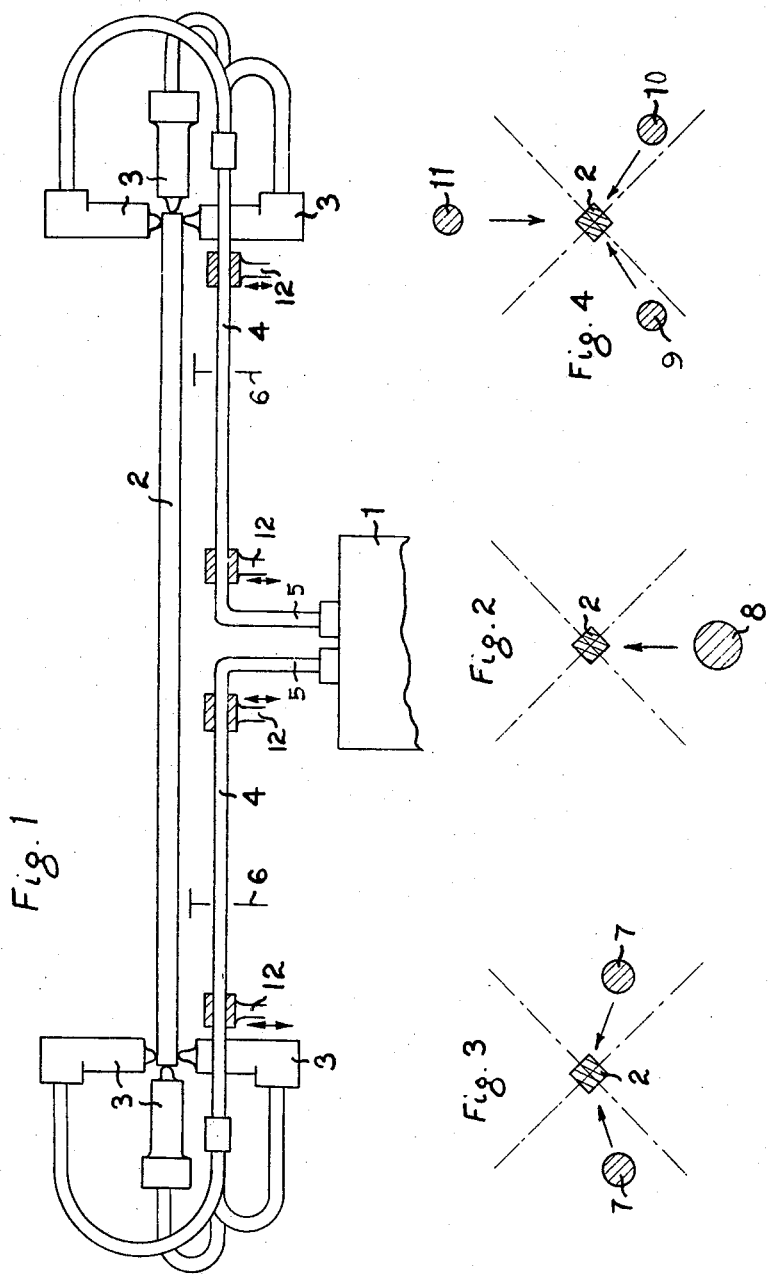

3,509,315
DEVICE FOR THE UNIFORM SUPPORT OF METALLIC WORKPIECES DIRECTLY HEATED BY ELECTRIC CURRENT
Erich Breuer, Holzen, and Werner Kielhorn, Essen-Steele, Germany, assignors to Aktiengesellschaft Brown, Boveri & Cie, Baden, Switzerland, a joint-stock company
Filed June 14, 1965, Ser. No. 463,626
Claims priority, application Germany, June 18, 1964, B 77,300
Int. Cl. C21d 9/62; H05b 1/00
U.S. Cl. 219—156                                     5 Claims

ABSTRACT OF THE DISCLOSURE

For electrically heating a horizontally supported elongated workpiece by passing a current through the workpiece from one end thereof to the other, one or more current supply conductors are arranged below the level of, and parallel with, the workpiece so that the resultant electrodynamic forces created between these supply conductors and the workpiece by the rated value of the heating current passing through them approximately compensates the dead weight of the workpiece. Thus the workpiece is, in effect, practically floated electrodynamically in its horizontal attitude without sag while the current flows and eliminates the necessity for providing longitudinally spaced supports along the workpiece to keep it from sagging too much during the heating process, these supports being undesirable for the reason that they do not prevent all sag and also involve a loss of heat from the workpiece by conduction through the support.

---

For heating billets and similar workpieces which have to be subsequently hot formed, for example in rod mills, or for heat treatment, heating by means of the direct passage of an electric current is often used. The elongated workpiece, which is supported in a horizontal attitude, is supplied with electric current by way of two or more electrodes at the ends of the workpiece. The workpiece that has to be heated can only be supported at a few points so that due to its dead weight it tends to bend between the supporting points. This bending effect increases with the heating temperature and is a disadvantage as regards the subsequent forming operation.

In order to prevent long workpieces from bending too much, it has been the practice to provide a number of fixed or movable supports. These supports are so dimensioned that they only make contact with the workpiece when it sags. When supports are used, heat losses occur due to conduction, and bending is not entirely prevented.

The object of the present invention which concerns a device for supporting billets, rods, tubes, and the like, which are directly heated by the passage of an electric current, is to avoid the aforesaid disadvantages. According to the invention this is achieved by arranging the conductors which supply the current in such a manner with respect to the workpiece that has to be heated that the distance between the workpiece and the conductors is such that the electrodynamic force effect which occurs at the rated value of the heating current approximately compensates the dead weight of the workpiece.

The foregoing as well as other objects and advantages inherent in the invention will become more apparent from the following detailed description of several typical embodiments thereof when considered with the accompanying drawings wherein:

FIG. 1 is a side elevation showing a typical arrangement for electrodynamically supporting an elongated workpiece while it is being heated electrically;

FIG. 2 is a detailed transverse section showing one suitable arrangement for deriving the electrodynamic workpiece supporting effect, the electrodynamic force being established by means of a single supply conductor located vertically beneath and parallel with the workpiece;

FIG. 3 is a detailed transverse section similar to FIG. 2 but illustrating an alternative arrangement wherein two supply conductors parallel with the workpiece are arranged below the level of the workpiece and symmetrically to each side of a vertical plane through the axis of the workpiece; and FIG. 4 is a detailed transverse section showing a further possible arrangement of the supply conductors, there being two such supply conductors located below the level of the workpiece and laterally offset from a vertical plane through the axis of the workpiece as in FIG. 3 and a third supply conductor located above the workpiece in such vertical plane.

In FIG. 1 current passes from a transformer 1 by way of contacts 3 to the horizontally supported workpiece 2 that has to be heated. The conductors which connect the current source 1 with the contacts 3 are arranged below the level of the workpiece and lie parallel to the latter. In order that sections 4 of the conductors which are parallel with the workpiece are as far as possible in close vicinity to the workpiece under the entire length of the latter, sections 5 of the connecting conductors can be arranged parallel to each other from the outlet of the transformer to the vicinity of the workpiece, whereby the conductors located parallel to the workpiece and supported in holders 12 can be moved perpendicular to the longitudinal axis of the workpiece by known means, for instance hydraulically. Such movement of the conductors and holders is illustrated diagrammatically by the double-ended arrows. The workpiece is held in supports 6 as long as the heating current does not flow or after the heating has been switched off again.

FIGS. 2 to 4 show various possible arrangements for the sections 4 of the connecting conductors. The simplest arrangement is illustrated in FIG. 2. The section 4 of the connecting leads consist of a conductor 8 in one or more longitudinal sections as shown in FIG. 1 which is arranged vertically underneath the workpiece and which extends for substantially the entire length thereof. In order to compensate the weight of the workpiece in a stable manner, sections 4 of the connecting conductors can be divided into two or more separate conductors 7 which are located laterally of and lower than the workpiece, as shown in FIG. 3. The two conductors 7 are located symmetrically to opposite sides of a vertical plane extending through the axis of the workpiece.

FIG. 4 shows a modified arrangement for the sections 4 of the connecting conductors. Sections 4 are divided into three separate conductors 9, 10, 11 distributed about the axis of the workpiece. The advantage of this arrangement is that conductor 11, which is located in a vertical plane above the axis of the workpiece, prevents the workpiece from bending upwards. The other two supply conductors 9 and 10 are located below the level of the workpiece and are laterally and symmetrically offset from the vertical plane containing supply conductor 11.

Although the invention has been explained by means of special embodiments, it is not restricted to them, because other embodiments are also conceivable within the scope of the invention which also produce the desired state of suspension for the workpiece. In plants which are designed only for one size of billet, the spacing of the current leads from the workpiece is so fixed that the workpiece is in suspension at the rated current.

Plants for billets with variable cross-sections utilize different current strengths; thus small cross-sections of the same material require lower currents because otherwise the specific current loading would become excessive and the repelling force of the conductors located underneath the billet would bend it upwards.

By adjusting the distance of the supply conductor from the workpiece and also by adapting the current strengths to suit the cross-section of the billet in question, it is possible to compensate to a great extent the weight of a billet to be treated in heating plants constructed for various billet cross-sections.

In connection with the arrangement according to the invention it is an advantage that considerably fewer supports 6 are necessary when compared with the billet heating plants used hitherto. The heat losses are thus considerably reduced and uniform temperature conditions are obtained over the entire length of the billet. Moreover the billet remains straight along its entire length and this is an advantage as regards its further working.

We claim:

1. Apparatus for uniformly supporting an elongated workpiece in a horizontal attitude during electrical heating thereof which comprises a current supply conductor member located vertically below and parallel with said workpiece, and connections between said current supply conductor member and the opposite ends of said workpiece to establish a flow of heating current through said workpiece from one end thereof to the other, the magnitude of the current in said conductor member being of such value that the resultant electrodynamic forces created between said current supply conductor member and said workpiece during flow of the current at its rated value serving to substantially compensate the dead weight of said workpiece and maintain said workpiece in a substantially horizontal position.

2. Apparatus for uniformly supporting an elongated workpiece in a horizontal attitude during electrical heating thereof which comprises a pair of current supply conductor members positioned below the level of and parallel with said workpiece and located symmetrically to opposite sides respectively of a vertical plane passed through the axis of said workpiece, and connections between said current supply conductor members and the opposite ends of said workpiece to establish a flow of heating current through said workpiece from one end thereof to the other, the magnitude of the current in said conductor members being of such value that the resultant electro dynamic forces created between said current supply conductor members and said workpiece during flow of the current at its rated value serving to substantially compensate the dead weight of said workpiece and maintain said workpiece in a substantially horizontal position.

3. Apparatus as defined in claim 2 for electro-dynamically supporting an elongated workpiece in a horizontal attitude during electrical heating thereof and which includes a third current supply conductor member located above and parallel with said workpiece in said vertical plane.

4. Apparatus for uniformly supporting an elongated workpiece in a horizontal attitude during electrical heating thereof which comprises current supply conductor means arranged below the level of and parallel with said workpiece, connections between said current supply conductor means and the opposite ends of said workpiece to establish a flow of heating current through said workpiece from one end thereof to the other, the magnitude of the current in said conductor means being of such value that the resultant electrodynamic forces created between said current supply conductor means and said workpiece during flow of the current at its rated value serving to substantially compensate the dead weight of said workpiece and maintain said workpiece in a substantially horizontal position, and support means for said current supply conductor means, said support means being adjustable towards and away from said workpiece thereby to effect a corresponding adjustment in the distance between said current supply conductor means and said workpiece.

5. Apparatus for uniformly supporting an elongated workpiece in a horizontal attitude during electrical heating thereof which comprises current supply conductor means arranged below the level of and parallel with said workpiece, connections between said current supply conductor means and the opposite ends of said workpiece to establish a flow of heating current through said workpiece from one end thereof to the other, the magnitude of the current in said conductor means being of such value that the resultant electrodynamic forces created between said current supply conductor means and said workpiece during flow of the current at its rated value serving to substantially compensate the dead weight of said workpiece and maintain said workpiece in a substantially horizontal position, and auxiliary supporting means for said workpiece and which are arranged in spaced relation along and below said workpiece, said auxiliary supporting means being in contact with said workpiece for the support thereof only when there is no heating current flowing through said workpiece.

References Cited

UNITED STATES PATENTS 496,592    5/1893    Burton _____ 219—156 X

JOSEPH V. TRUHE, Primary Examiner

P. W. GOWDEY, Assistant Examiner

U.S. Cl. X.R.

219—155, 156